United States Patent [19]

Kaplan

[11] 4,452,520

[45] Jun. 5, 1984

[54] LEVER FOR FOLDING A CAMERA HAVING A RETRACTABLE LIGHT SOURCE

[75] Inventor: Jonathan I. Kaplan, West Newton, Mass.

[73] Assignee: Polaroid Corporation, Cambridge, Mass.

[21] Appl. No.: 450,284

[22] Filed: Dec. 16, 1982

[51] Int. Cl.³ .................. G03B 17/04; G03B 13/02
[52] U.S. Cl. .................................. 354/126; 354/187
[58] Field of Search ............ 354/126, 187, 192, 193, 354/194, 153

[56] References Cited

U.S. PATENT DOCUMENTS

| | | | |
|---|---|---|---|
| 2,941,460 | 6/1960 | Eburn, Jr. | 95/40 |
| 3,087,400 | 4/1963 | Brandt | 95/40 |
| 3,479,941 | 11/1969 | Erlichman | 354/187 |
| 3,543,661 | 12/1970 | Rosen | 95/11 |
| 3,589,253 | 6/1971 | Erlichman | 95/11 |
| 3,683,770 | 8/1972 | Land et al. | 354/193 |
| 4,316,658 | 2/1982 | Bundschuh et al. | 354/27 |
| 4,389,110 | 6/1983 | Pizzuti | 354/187 |
| 4,392,732 | 7/1983 | Pizzuti | 354/187 |
| 4,395,102 | 7/1983 | Pizzuti | 354/187 |

*Primary Examiner*—Benjamin R. Fuller
*Assistant Examiner*—Douglas S. Lee
*Attorney, Agent, or Firm*—Alfred E. Corrigan

[57] ABSTRACT

A folding camera including first, second and third housings pivotally interconnected for movement between an operative extended position and a folded position, and a source of artificial illumination, e.g., a strobe, which automatically moves into an operative position as the housings move into the fully extended position. A manually operable lever is pivotally coupled to the third housing and coupled to the strobe such that the rotation of the lever from a first position to a second position is effective to initially move the strobe into a retracted position and thereafter continued application of force to the lever causes rotation of the third and second housings into a folded position atop the first housing.

4 Claims, 3 Drawing Figures

LEVER FOR FOLDING A CAMERA HAVING A RETRACTABLE LIGHT SOURCE

RELATED APPLICATION

This application relates to an improvement of the invention disclosed in U.S. patent application Ser. No. (450,282) filed on even date herewith by R. J. Fraser et al., entitled "Folding Camera Having Erectable Light Source", and assigned in common herewith.

BACKGROUND OF THE INVENTION

1. Field of the Invention

The invention relates to a folding camera having means for moving a plurality of components of the camera into a folded position.

2. Description of the Prior Art

The present invention relates to a folding camera and, more particularly, to means for moving various components of the camera into a folded position. Generally, the movement of the various components of a camera between an extended operative position and an inoperative folded position is accomplished by a somewhat complicated linkage system which, often times, requires some knowledge on the part of the user as to which link should be actuated and when it should be actuated. Examples of the foregoing may be found in U.S. Pat. Nos. 2,941,460 and 3,087,400. In others, such as that shown in U.S. Pat. No. 3,543,661, a user may try to actuate a link without first unlatching the linkage assembly thereby possibly damaging the assembly. Still another arrangement is shown in U.S. Pat. No. 3,589,253 wherein a rangefinder-viewfinder is pivotally coupled to the ends of a pair of erecting links. However, with this arrangement, the tolerances of the erecting system must be kept within limits as well as those between the operating components of the rangefinder and the linkage connecting the rangefinder to the camera's lens assembly. Accordingly, it can be seen that there is a need for an extremely simple, inexpensive and easy-to-use means for moving the various components of a folding type camera into a folded position.

SUMMARY OF THE INVENTION

The instant invention relates to a folding camera having a source of artificial illumination and, more particularly, to one having an easy-to-use means for moving the various elements of the camera into a folded position. The camera includes first, second and third housings which are pivotally interconnected for movement between a compact, folded, inoperative position and an extended operative position in which a shutter and lens assembly in the third housing directs light from a scene to a mirror assembly positioned adjacent the second housing which, in turn, reflects the light towards a length of film supported within the first housing. The third housing includes a recess or chamber which is adapted to enclose the source of artificial illumination, preferably a strobe, when the strobe is in a retracted inoperative position. The strobe is constructed to automatically move into an opening near one end of the second housing as the three housings enter the extended operative position thereby positioning itself for subsequent illumination of a scene to be photographed as well as effectively latching the second and third housings against further movement relative to each other and to the first housing.

When the housings of the camera are in the folded inoperative position, the length of the camera is maintained at a minimum by having previously rotated the third housing back onto the first housing rather than in the opposite direction where it would have added to the overall length of the folded camera. However, in the particular camera described herein, in order to prevent damage to the camera's bellows it is desirable to move the mirror assembly almost fully into a down position before the third housing can be pivoted back onto the first housing and the mirror assembly. This movement of the mirror assembly is accomplished by utilizing the movement of the strobe into its retracted inoperative position to drive a link assembly which is connected to the mirror assembly.

The movement of the strobe into its retracted position and the movement of the housings into the folded position is facilitated by a lever which is pivotally attached to one side of the third housing. The lever has an arcuate slot therein which is adapted to receive an end of a pin which extends outwardly from an extension of the strobe and through a linear slot in the side of the third housing. Rotation of the lever through an angle of approximately sixty degrees by the user's index finger is effective, via said pin and arcuate slot arrangement, to fully retract the strobe and thus move the mirror assembly toward the fully down position. When the strobe enters its fully retracted position, continued pressure on the lever is now effective to move the third housing about its pivot toward its folded position, which in turn, via a second pin and slot arrangement between the second and third housings, causes the second housing to move into the folded position.

An object of the invention is to provide a folding camera having a retractable source of artificial illumination with a manually actuatable means for sequentially moving the source of artificial illumination into its retracted position and then various housings of the camera into a folded position.

Another object of the invention is to provide a folding camera with a simple lever for sequentially moving a source of artificial illumination into a retracted position and a mirror assembly towards a fully down or non-reflecting position prior to moving various housings of the camera into their folded position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

DETAILED DESCRIPTION OF THE INVENTION

Figure 1:
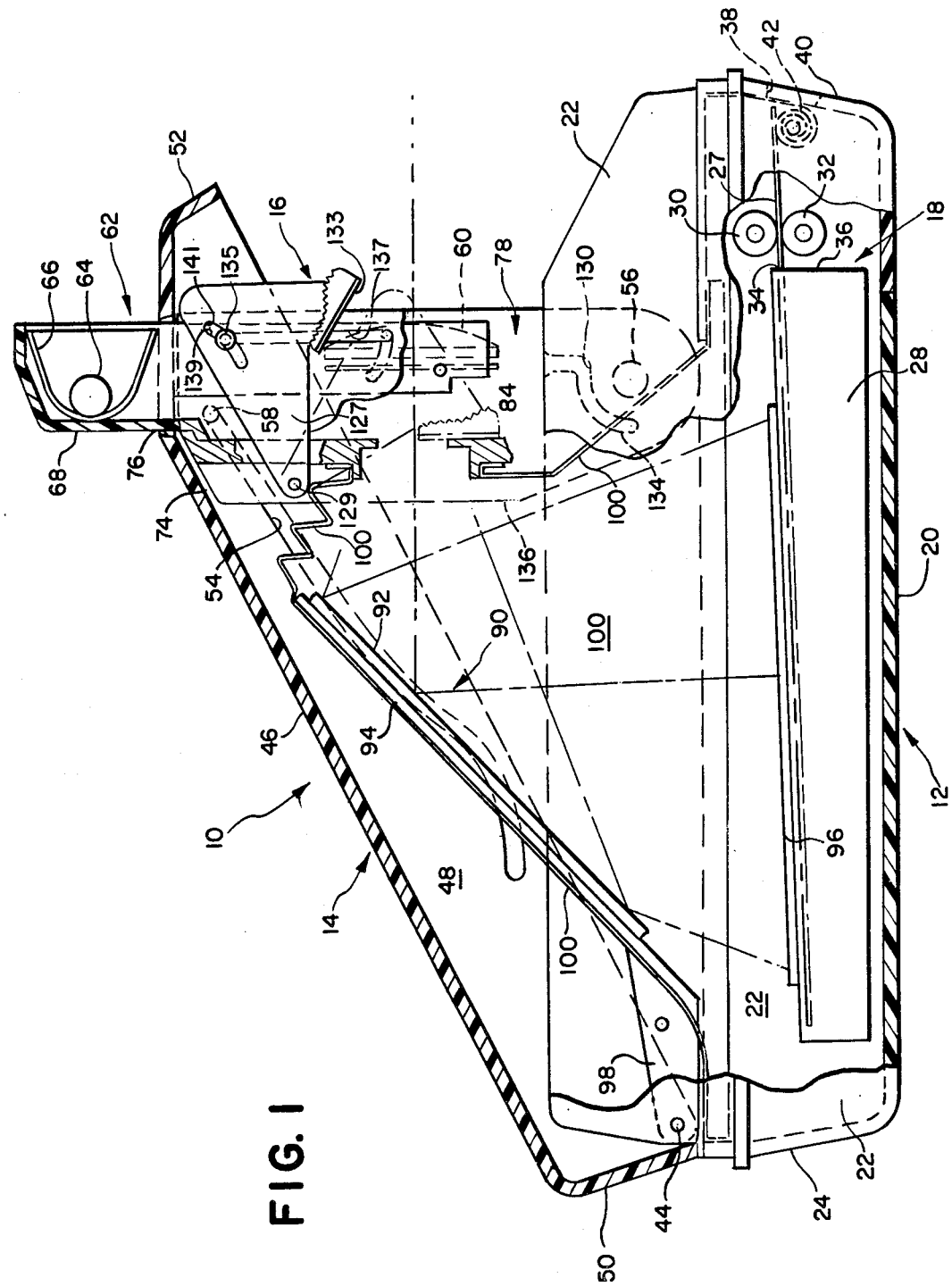
FIG. 1 is a side elevational view, partly in section, of a folding camera which incorporates a preferred form of the invention, the camera being shown in its extended operative position.
Figure 2:
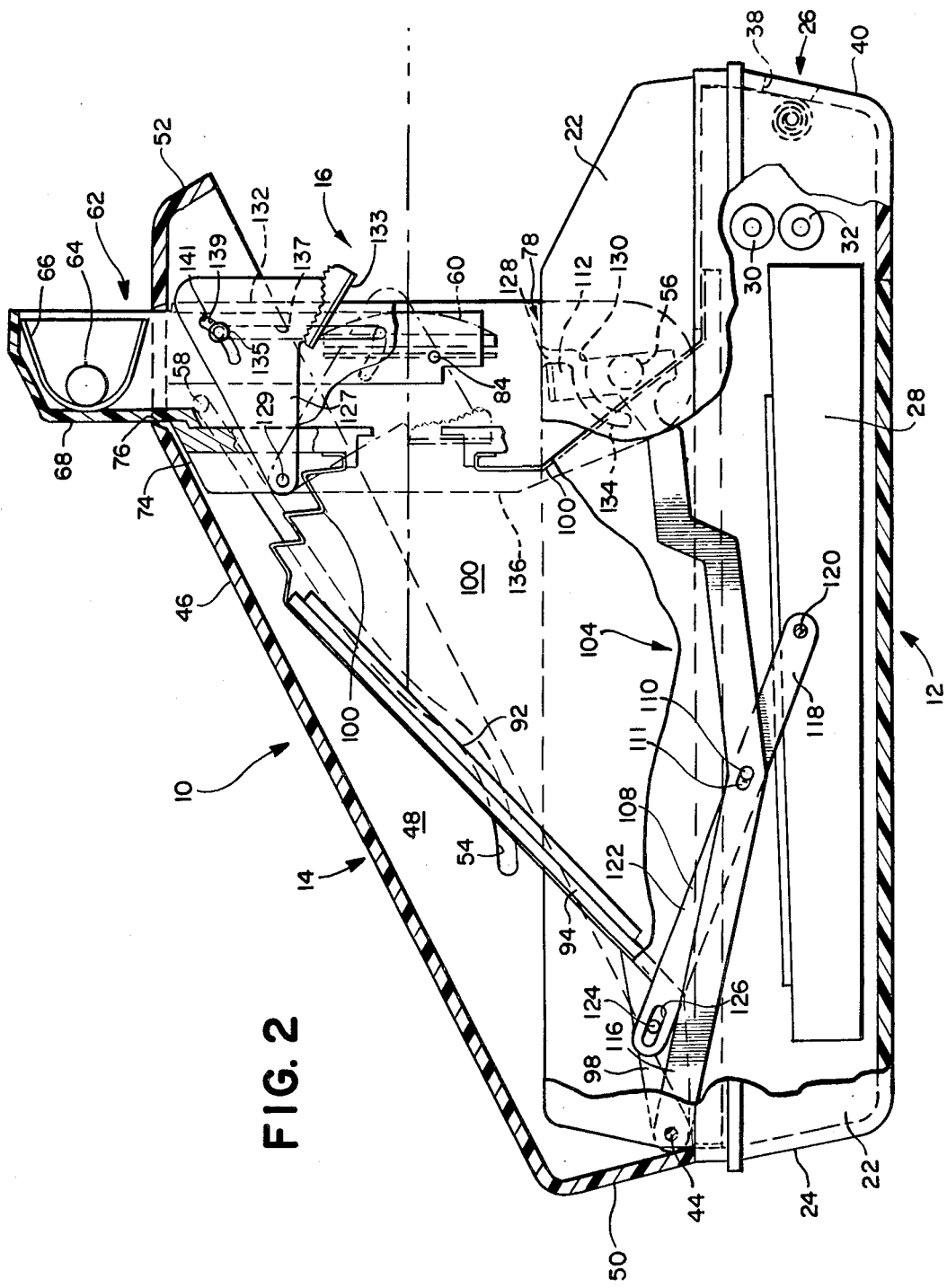
FIG. 2 is a view similar to FIG. 1 with several parts omitted so as to clearly show the interrelation between a strobe assembly, a mirror assembly, and a linkage system for transferring downward movement of the strobe to the mirror assembly.
Figure 3:
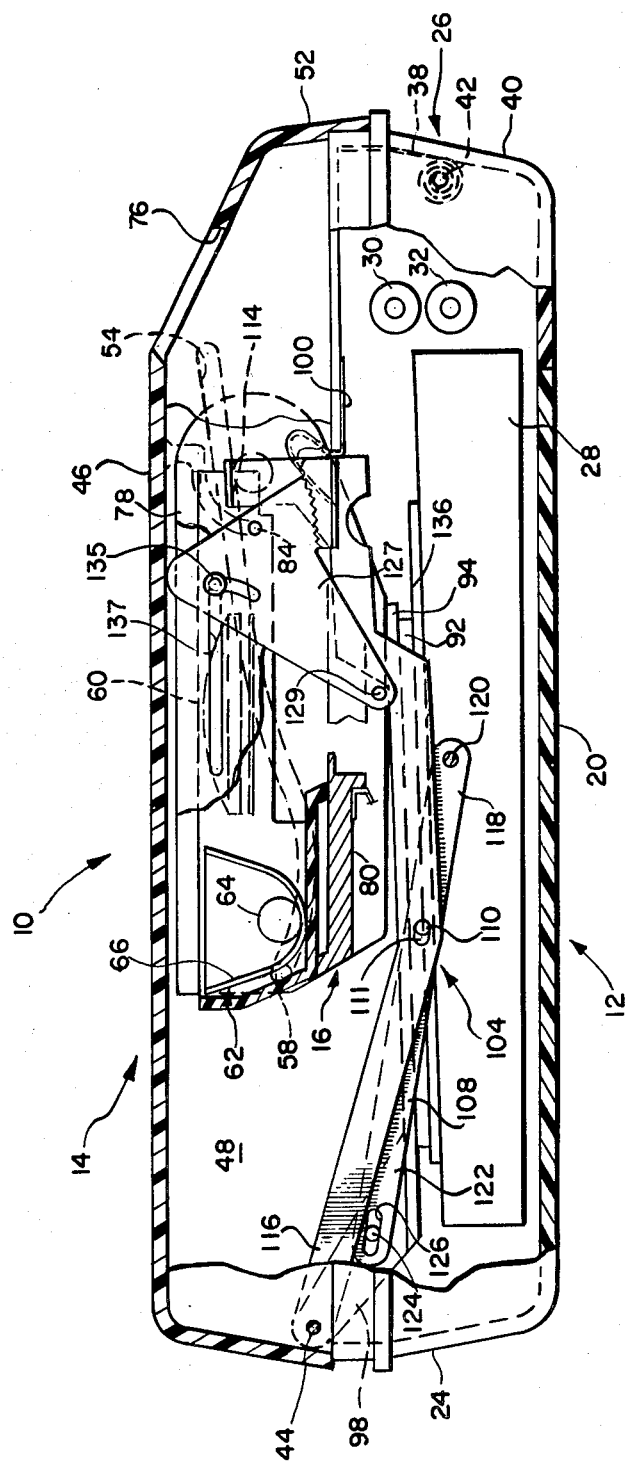
FIG. 3 is a view similar to FIG. 2 showing the various housings of the camera in their folded inoperative position.

Reference is now made to the drawings wherein is shown a folding camera 10. The camera 10 includes first, second and third housings 12, 14 and 16 which are pivotally interconnected for movement between an extended operative position, as shown in FIGS. 1 and 2, and a folded inoperative position, as shown in FIG. 3.

The first housing 12 includes a chamber 18 having a bottom wall 20, a pair of side walls 22, and a trailing end wall 24. An open end of the chamber 18 is closed by a spread roller housing 26 which is pivotally connected to the housing 12 such that it may be pivoted in a clockwise direction, as viewed in FIG. 1, to a position wherein a film cassette 28, containing a plurality of film units of the self-developing type, may be inserted endwise into the chamber 18. The spread roller housing 26 may then be returned to the position shown in FIG. 1 where a pair of cylindrical rollers 30 and 32, at least one of which is motor driven, are mounted in position to receive therebetween an exposed film unit 27 as it is being advanced from the film cassette 28 via an exit slot 34 in a leading end wall 36. As is well known in the art, the rollers 30 and 32 are adapted to rupture a pod of processing liquid attached to a leading end of the exposed film unit 27 and spread its contents between layers of the film unit to initiate the formation of a visible image while simultaneously advancing it to the exterior of the camera via an egress 38 in a leading end wall 40 of the housing 26. As the exposed film unit 27 is moved through the egress 38, its leading end engages and unwinds a resilient opaque shade 42 which progressively completely covers the upper surface of the film unit 27 so as to momentarily protect its photosensitive layer from further exposure by the ambient light. For a more detailed description of the interaction between the film, the spread rollers 30 and 32, and the shade 42, reference may be had to U.S. Pat. No. 3,940,774 granted to A. S. Ivester on Feb. 24, 1976, and assigned in common herewith.

The second housing 14 is pivotally coupled to a first end of the first housing 12 by a hinge 44. The second housing 14 includes a top wall 46 from which depend a pair of side walls 48 (only one being shown), a trailing end wall 50, and a leading end wall 52. A cam track 54 is formed in the interior surface of each of the side walls 48.

The third housing 16 has one of its ends pivotally coupled to the first housing 12 at a hinge 56 located near a second end thereof. A second end of the third housing 16 is pivotally coupled to a second end of the second housing 14 via a pin 58 which extends outwardly from each lateral side of the housing 16; each pin 58 being located within its respective cam track 54. Mounted within the third housing 16 is a lens and shutter assembly 60, and to the near side of the housing 16, as viewed in FIG. 1, a source of artificial illumination, preferably a strobe 62, is mounted for linear movement within a recess 78.

The strobe 62 includes a lamp 64 mounted within a reflector 66 which, in turn, is mounted within a frame 68. The strobe 62 includes a stop 70 which is adapted to engage an interior surface of a wall 74 to limit upward movement of the strobe 62 into its erected position. As the strobe 62 moves into its erected operative position, the frame 68 moves out of the housing 16 via an opening 72 in the wall 74 of the housing 16 and through an opening 76 in the top wall 46 of the second housing 14. The dimensions of the frame 58 are slightly smaller than the corresponding dimensions of the opening 76 thereby insuring that there is no substantial movement therebetween when the strobe 62 is in its erected operative position. In its retracted inoperative position, the strobe 62 is substantially fully enclosed by the housing 16. Extending downwardly from the frame 68 is an extension 82 having an outwardly extending pin 84 located adjacent its end 86, the function of which will be explained shortly.

The lens and shutter assembly 60 is adapted to direct image-bearing light rays through an aperture 88 in a wall 80 and onto the reflecting surface of a mirror assembly 90 which includes a mirror 92 secured to a supporting member 94. The rays are redirected by the reflecting surface of the mirror 92 toward a film unit 27 located within the film cassette 28 adjacent to and in alignment with a generally rectangularly shaped exposure aperture defined by an upstanding rib 96. The supporting member 94 includes an extension 98 by which the supporting member 94 is pivotally secured to the hinge 44. Suitable spring means (not shown) resiliently bias the mirror assembly 90 into its operative reflecting position.

A flexible opaque bellows 100 is secured to the first and third housings 12 and 16, as shown in FIG. 1, and to the lower portion of the rear surface of the supporting member 94. In order to enable relative pivoting movement between the third housing 16 and the mirror assembly 90 without stressing the bellows 100, the upper two-thirds of the rear surface of the supporting member 94 is not secured to the adjacent portions of the bellows 100.

As best shown in FIGS. 2 and 3, the first housing 12 is constructed to enclose a linkage assembly 104 which is adapted to transmit movement of the strobe 62 into its retracted inoperative position into rotation of the mirror assembly 90 toward a fully down or non-reflecting position before the third housing 16 is unlatched from the second housing 14. More specifically, the linkage assembly 104 includes first and second links 106 and 108 pivotally connected together intermediate their ends by a pin 110 which extends outwardly from the link 108 and rides in a slot 111 in the link 106. The first link 106 includes one end 112 having an outwardly extending flange 114 located in position to be engaged by the end 86 of the strobe extension 82 as the strobe 62 is moved toward its retracted inoperative position, and a second opposite end 116 pivotally coupled about the axis of hinge 44. The second link 108 includes a first end 118 pivotally coupled at 120 to the first housing 12, and a second end 122 pivotally coupled to the extension 98 of the mirror support 94 via a pin 124 which extends outwardly therefrom and rides in a slot 126 in the second link 108.

The first, second and third housings 12, 14 and 16, respectively, are maintained in the extended operative position, as shown in FIGS. 1 and 2, by the interaction between the frame 68 of the strobe 62 and the cover 46 of the second housing 14, when the strobe 62 is in its erected operative position.

The movement of the various elements of the camera is facilitated by a simple lever 127 which is pivotally attached at 129 to the near side 131 of the third housing 16. The lever 127 includes an outwardly extending flange 133 upon which pressure from a digit, preferably the index finger of the right hand of the user, is to be applied to cause clockwise rotation of the lever 127 about its pivot 129 from a first position (shown in solid lines in FIG. 1) to a second position (shown in broken lines). The lever 127 is coupled to the strobe 62 by a pin 135 which extends outwardly from the strobe extension 82, through a vertical slot 137 in the side wall 131 of the third housing 16, and into an arcuate slot 139 in the lever 127.

When it is desired to fold the camera, the operator applies pressure to the lever 127 in a direction to cause it to rotate in a clockwise direction from the first or solid line position to the second or broken line position. This movement of the lever 127 is transmitted to the strobe 62 via the pin 135 and slot 139 coupling thereby moving the strobe 62 downwardly until the strobe frame 68 leaves the opening 76 in the top wall 46 of the second housing 14 and enters the third housing 16 via the opening 72. During this movement, the end 86 of the strobe extension 82 moves into engagement with the flange 114 on the link 106 and rotates it in a clockwise direction about the pivot 44 until the link 106 is located substantially in, but not completely in, the position shown in FIG. 3. Clockwise rotation of the link 106 is transmitted to the link 108 via the pivotal interconnection therebetween at 110 and 111 thereby causing the link 108 to rotate in a counterclockwise direction about its fixed pivot 120. This rotation of the link 108 is transmitted to the mirror assembly 90 via the pin 124 and slot 126 coupling to drive the mirror assembly 90, against its spring bias, substantially into, but not completely into, the position shown in FIG. 3. Substantially all of this movement of the links 106 and 108 and the mirror assembly 90 occurs before the strobe frame 68 clears the opening 76 in the second housing wall 46, thereby insuring that the third housing 16 cannot be rotated into a folded position until the mirror assembly 90 has been moved out of interference therewith. Also, during the latter part of the downward movement of the strobe 62, the pin 84 on the extension 82 enters the open end of a slot 128 located in an interior surface of the side wall 22 of the first housing 12. Downward movement of the strobe 62 is terminated when the lever 127 enters the second position and the pin 84 bottoms out in the end 130 of the slot 128. When the pin 84 bottoms out in the slot 128, further clockwise rotation of the lever 127 relative to the housing 16 is prevented since for all practical purposes the lever 127 and the housing 16 are a single unit. Accordingly, continued application of force to the lever 127 is now effective to rotate the third housing 16 and the lever 127, as a unit, about the pivot 56. Such rotation is effective to rotate the pin 84 into an arcuate slot 134 which is located in communication with the end 130 of the slot 128, thus locking the strobe 62 in its retracted inoperative position. Also, rotational movement of the third housing 16 is transmitted to the second housing 14 via the pin 58 and cam track 54 couplings to initially cause a few degrees of counterclockwise rotation of the second housing 14 about the hinge 44 thereby enabling the top wall 74 of the third housing 16 to clear the top wall 46 of the second housing 14. Continued counterclockwise rotation of the third housing 16 then causes the second housing 14 to reverse its rotation, i.e., rotate in a clockwise direction, as it follows the third housing 16 into the folded position shown in FIG. 3. Just before the housings 12, 14 and 16 enter the fully folded position, the user may remove his finger from the lever 127 and the last one or two degrees of rotation of the housing 14 may be completed by pressing it downwardly with the right hand, thus enabling the flange 133 to be located wholly within the confines of the camera when the camera is in the folded position.

Alternatively, either the side wall 22 of the first housing 12 or the side wall 48 of the second housing 14 may be recessed to provide clearance for the flange 133. As mentioned hereinabove, the mirror assembly 90 is close to, but not into, its fully down position when the strobe 62 originally enters its retracted position. This is because a rear surface 136 of the third housing 16 engages the mirror supporting member 94 during its last two or three degrees of counterclockwise rotation and rotates the mirror assembly 90 into its fully down position. Suitable means (not shown) such as friction latches on the first and second housings 12 and 14, respectively, may be used to maintain the camera 10 in the folded position.

Movement of the housings 12, 14 and 16 into the extended operative position is accomplished by holding the housing 12 in one hand while simultaneously grasping the housing 14 and rotating it in a counterclockwise direction about the hinge 44. Movement of the housing 14 is transmitted to the housing 16 via the pin 58 and cam slot 54 couplings to rotate it in a clockwise direction about its pivot 56. During the first two or three degrees of rotation of the housing 16, the end 112 of the link 106 follows the rear surface 136 of the housing 16 until the flange 114 again engages the end 86 of the strobe extension 82, such link movement being under the bias of the mirror assembly 90 biasing springs (not shown). The rotation of the housings 14 and 16 is continued until the pin 58 nears the end of the cam slot 54. At this time, the frame 68 of the strobe 62 moves into alignment with the opening 76 in the top wall 46 of the housing 14, and the pin 84 into the end of the slot 128. The bias of the mirror assembly's springs, acting through the linkage assembly 104 and the strobe extension 86, move the lever 127 into the first position and the strobe 62 into its erected operative position, as shown in FIGS. 1 and 2 wherein it releasably locks or latches the housings 14 and 16 against further movement relative to each other or to the housing 12. Simultaneously, the mirror assembly 90 is driven into its operative reflecting position. The movement of the mirror assembly 90 is stopped when the stop 70 on the strobe 62 engages the top wall 74 of the housing 16.

Since certain changes may be made in the above-described invention without departing from the scope thereof, it is intended that all matters contained in the above description or shown in the accompanying drawings shall be interpreted as illustrative and not in a limiting sense.

What is claimed is:

1. A folding camera comprising: a first housing having first and second ends, said first housing being adapted to support a film cassette in position for the exposure of a length of film contained therein;

a second housing pivotally mounted adjacent said first end of said first housing;

a third housing having one end thereof pivotally coupled to said first housing near said second end of said first housing, said third housing further includes a second end which is pivotally coupled to a second end of said second housing thereby enabling movement of said first, second and third housings between a folded, compact, inoperative position and an extended, operative position wherein light may be directed toward said first housing so as to photographically expose the length of film;

a source of artificial illumination coupled to said third housing for movement between a retracted inoperative position, when said first, second and third housings are out of said extended operative position, and an erected operative position in which it cooperates with said second end of said second housing to releasably lock said first, second and third housings in said extended operative position; and a manually operable lever coupled to said third housing and to said source of artificial illumination for movement between first and second positions, movement of said lever from said first position to said second position being effective to move said source of artificial illumination from said erected operative position to said retracted position and continued application of force to said lever when in said second position being effective to rotate said second and third housings in opposite directions into said folded position.

2. A folding camera as defined in claim 1 wherein said manually operable lever is pivotally coupled to said third housing and includes means defining an arcuate slot having opposite ends, and said source of artificial illumination includes a pin which extends into said slot, whereby manual rotation of said lever from said first position to said second position is effective to transfer linear movement to said source of artificial illumination to move it into said retracted position while simultaneously moving one of said ends of said slot toward said pin as said lever enters said second position, and continued application of manual force to said lever is effective to rotate said third housing toward said folded position.

3. A folding camera as defined in claim 2 wherein said lever includes an outwardly extending flange upon which an index finger of a user is to apply a force to rotate said lever downwardly and toward the user as said lever is rotated from said first position to said second position.

4. A folding camera as defined in claim 1 further including a mirror assembly pivotally coupled to said second housing for movement between a light reflecting position and a fully down or non-reflecting position, and a linkage assembly for transmitting movement of said source of artificial illumination into said retracted position to said mirror assembly so as to rotate it toward said fully down position, whereby rotation of said lever into said second position is transmitted to said mirror assembly via said source of artificial illumination and said linkage assembly to rotate it toward said fully down position.

* * * * *